(12) United States Patent
Hayashi et al.

(10) Patent No.: US 7,165,454 B2
(45) Date of Patent: Jan. 23, 2007

(54) ULTRASONIC SENSOR UNIT

(75) Inventors: Kenji Hayashi, Tokyo (JP); Koji Ohata, Tokyo (JP); Yoshio Katayama, Hyogo (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 45 days.

(21) Appl. No.: 11/047,352

(22) Filed: Jan. 31, 2005

(65) Prior Publication Data

US 2005/0188768 A1 Sep. 1, 2005

(30) Foreign Application Priority Data

Jan. 29, 2004 (JP) ............... 2004-021464

(51) Int. Cl.
*G01N 29/00* (2006.01)

(52) U.S. Cl. .......................... 73/649; 73/655

(58) Field of Classification Search ............ 73/649, 73/591, 625, 655, 117; 367/117
See application file for complete search history.

(56) References Cited

U.S. PATENT DOCUMENTS

| 4,891,796 A | 1/1990 | Sekine |
| 5,263,006 A | 11/1993 | Hermesmeyer |
| 6,317,033 B1 * | 11/2001 | Kobayashi et al. ....... 340/388.1 |
| 6,544,364 B2 * | 4/2003 | Maeda et al. .................. 156/64 |
| 6,749,703 B2 * | 6/2004 | Iwashita et al. ............... 156/64 |
| 6,780,264 B2 * | 8/2004 | Nakata et al. ................. 156/64 |

FOREIGN PATENT DOCUMENTS

| DE | 36 15 907 A1 | 11/1986 |
| DE | 37 19 146 A1 | 12/1988 |
| DE | 40 00 698 A 1 | 7/1991 |
| DE | 199 17 862 A 1 | 11/1999 |
| DE | 100 18 807 A1 | 10/2001 |
| DE | 101 48 202 C1 | 3/2003 |
| DE | 103 33 732 B3 | 12/2004 |
| JP | 61187184 U | 11/1986 |
| JP | 2000-032594 A | 1/2000 |
| JP | 2003-118476 A | 4/2003 |

OTHER PUBLICATIONS

Office Action issued on Dec. 9, 2005 in related German Application No. DE10 2005 003 829.8.

* cited by examiner

*Primary Examiner*—Hezron Williams
*Assistant Examiner*—Jacques Saint-Surin
(74) *Attorney, Agent, or Firm*—Rossi, Kimms & McDowell LLP

(57) ABSTRACT

In order to arrange a heater effectively in a case containing ultrasonic sensors to melt frozen snow attached to the case assuredly to ensure the performance of the ultrasonic sensors, an ultrasonic sensor unit comprises ultrasonic sensors (9, 10), a case (11, 12) for containing the ultrasonic sensors, and a sheet component (20) arranged on an inner side of a bottom (12*c*) of the case to cover the bottom, and having a heater (22) buried in or mounted on it.

6 Claims, 9 Drawing Sheets

ULTRASONIC SENSOR UNIT

CROSS-REFERENCE TO RELATED APPLICATIONS

This non-provisional application claims priority under 35 U.S.C. § 119(a) on Patent Application No. 2004-21464 filed in Japan on Jan. 29, 2004, the entire contents of which are hereby incorporated by reference.

BACKGROUND OF THE INVENTION

1. Field of the Invention

This invention relates to an ultrasonic sensor unit, and in particular, an ultrasonic sensor unit used for adjustment of optical axes of vehicle headlamps.

2. Description of the Related Art

In recent years, for headlamps, high-intensity lamps have been coming into use from the standpoint of safety.

However, while the high-intensity lamp contributes much to safety, it has a drawback that the risk of dazzling oncoming vehicles is high. Hence, techniques of adjusting the optical axes of headlamps according to the inclination of a vehicle have been being developed.

For example, there has been developed an optical axis adjustment apparatus in which two ultrasonic sensors are arranged, for example at the front end of a frame of a truck, along the longitudinal direction of the vehicle. Their sending elements send out ultrasonic waves toward the road surface, and their receiving elements receive the ultrasonic waves reflected by the road surface, respectively. From the difference between the times of reception of these reflected waves, the inclination of the front part of the vehicle is detected, and the optical axes of the headlamps are adjusted according to the inclination detected. An optical axis adjustment apparatus of this type is disclosed in Japanese Unexamined Patent Publication No. 2003-118476, for example.

In the optical axis adjustment apparatus disclosed in this patent publication, the ultrasonic sensors are arranged in the positions near the road surface. Hence, there is a problem that when the vehicle runs, for example on a road with fallen snow, snow and water drops splashed by the vehicle in a low temperature adhere to the ultrasonic sensors as frozen snow, and cause deterioration in the performance of the ultrasonic sensors.

Generally, the ultrasonic sensors are contained in a case and the case is fitted to, for example the frame. In order to improve the performance of the ultrasonic sensors and expose the sending and receiving elements, horns are formed to protrude from the inner side of the bottom of the case, having a tapered opening having a diameter gradually increased toward the outside of the case. In this arrangement, the above problem is serious, since frozen snow easily becomes stuck in the horn.

In this arrangement, even if frozen snow does not become stuck in the horn, water drops may run down the wall of the horn and turn to ice near the boundary between the horn and the bottom (in other words, the open end of the horn). The frozen snow may adhere to this open end like icicles, interfere with the ultrasonic wave signals sent out and received by the ultrasonic sensors, and prevent the ultrasonic sensors from operating normally.

In order to solve this problem, it is conceivable to add a heating means to the case. However, how to arrange the heating means effectively is an issue.

This invention has been made to solve the problems discussed above. An object of the invention is to provide an ultrasonic sensor apparatus in which a heater is arranged effectively in a case containing ultrasonic sensors to melt frozen snow attached to the case assuredly to ensure the performance of the ultrasonic sensors.

SUMMARY OF THE INVENTION

In order to achieve the above object, an ultrasonic sensor unit according to claim 1 comprises an ultrasonic sensor; a case for containing the ultrasonic sensor; and a sheet component arranged on an inner side of a bottom of the case to cover the bottom, and having a heater buried in or mounted on it.

An ultrasonic sensor unit according to claim 2 comprises an ultrasonic sensor; a case for containing the ultrasonic sensor, the case having a horn protruding from an inner side of a bottom of the case and having a tapered opening having a diameter gradually increased toward the outside of the case, to expose an sending element and a receiving element of the ultrasonic sensor to the outside of the case; and a sheet component arranged on the inner side of the bottom of the case to cover the bottom and surround the horn, and having a heater buried in or mounted on its part covering the bottom.

An ultrasonic sensor unit according to claim 3 comprises an ultrasonic sensor; a case for containing the ultrasonic sensor, the case having a horn protruding from an inner side of a bottom of the case and having a tapered opening having a diameter gradually increased toward the outside of the case, to expose an sending element and a receiving element of the ultrasonic sensor to the outside of the case; and a sheet component arranged on the inner side of the bottom of the case to cover the bottom and surround the horn, and having a heater buried in or mounted on its part surrounding the horn.

An ultrasonic sensor unit according to claim 4 comprises an ultrasonic sensor; a case for containing the ultrasonic sensor, the case having a horn protruding from an inner side of a bottom of the case and having a tapered opening having a diameter gradually increased toward the outside of the case, to expose an sending element and a receiving element of the ultrasonic sensor to the outside of the case; and a sheet component arranged on the inner side of the bottom of the case to cover the bottom and surround the horn, and having a heater buried in or mounted on its part covering the bottom and its part surrounding the horn.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION OF THE PREFERRED EMBODIMENTS

An embodiment of the invention will be described based on the accompanying drawings.

Figure 1:
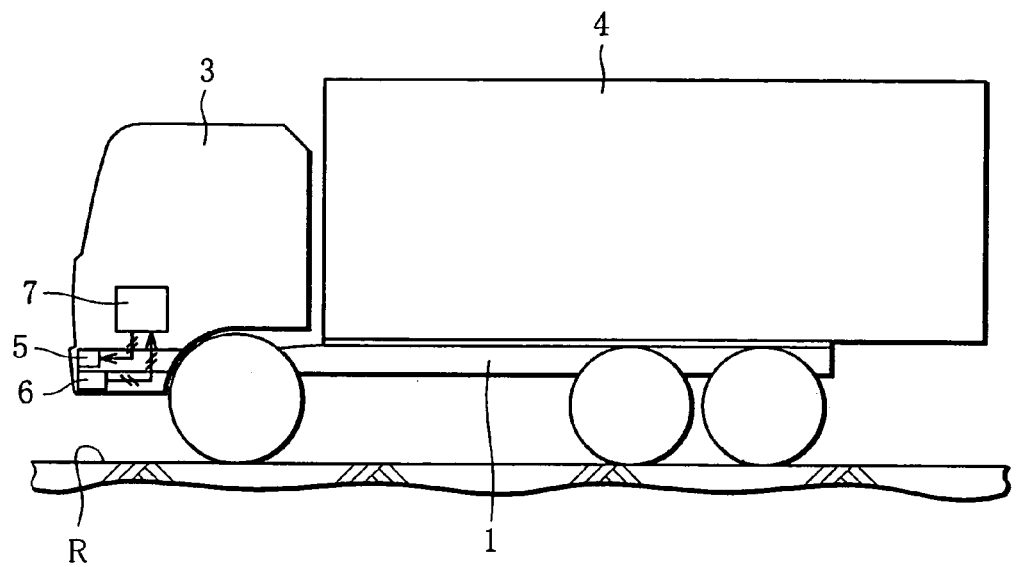
FIG. 1 is a diagram schematically showing the structure of a truck provided with a vehicle headlamp optical axis adjustment apparatus including an ultrasonic sensor unit according to the invention.
Figure 2:
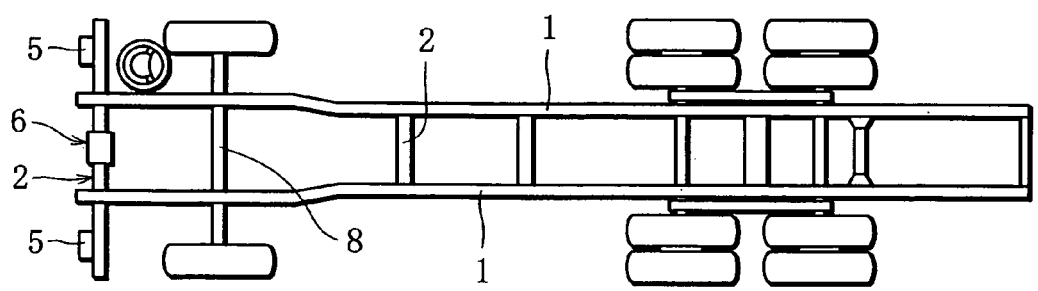
FIG. 2 is a plan view showing a frame of the truck shown in FIG. 1.

FIG. 1 is a diagram schematically showing the structure of a truck provided with a vehicle headlamp optical axis adjustment apparatus, and FIG. 2 is a plan view showing a frame of the truck shown in FIG. 1. As shown in FIGS. 1 and 2, the truck comprises a frame constructed mainly of a pair of side-frames 1 arranged on the left and right sides, and a plurality of cross members 2 arranged perpendicular to the side-frames 1. A cab 3 and a cargo bed 4 are mounted on the frame. Left and right headlamps 5 are arranged on the left and right sides of the cross member 2 located at the front end of the vehicle, and an ultrasonic sensor unit 6 using a plurality of ultrasonic sensors according to the present invention is arranged approximately in the center of this cross member 2. Detection signals from the ultrasonic sensor unit 6 are fed to an electronic control unit (ECU) 7, and the ECU 7 determines the inclination of the front part of the vehicle relative to the road surface R on the basis of the detection signals from the ultrasonic sensor unit 6.

The left and right headlamps 5 may be arranged on the cab 3. The ultrasonic sensor unit 6 may be arranged on a part other than the cross member 2 located at the front end of the vehicle (the cab 3, for example), although it needs to be arranged forward of a front axle 8 and upper side-rails of the front axle 8.

Figure 3:
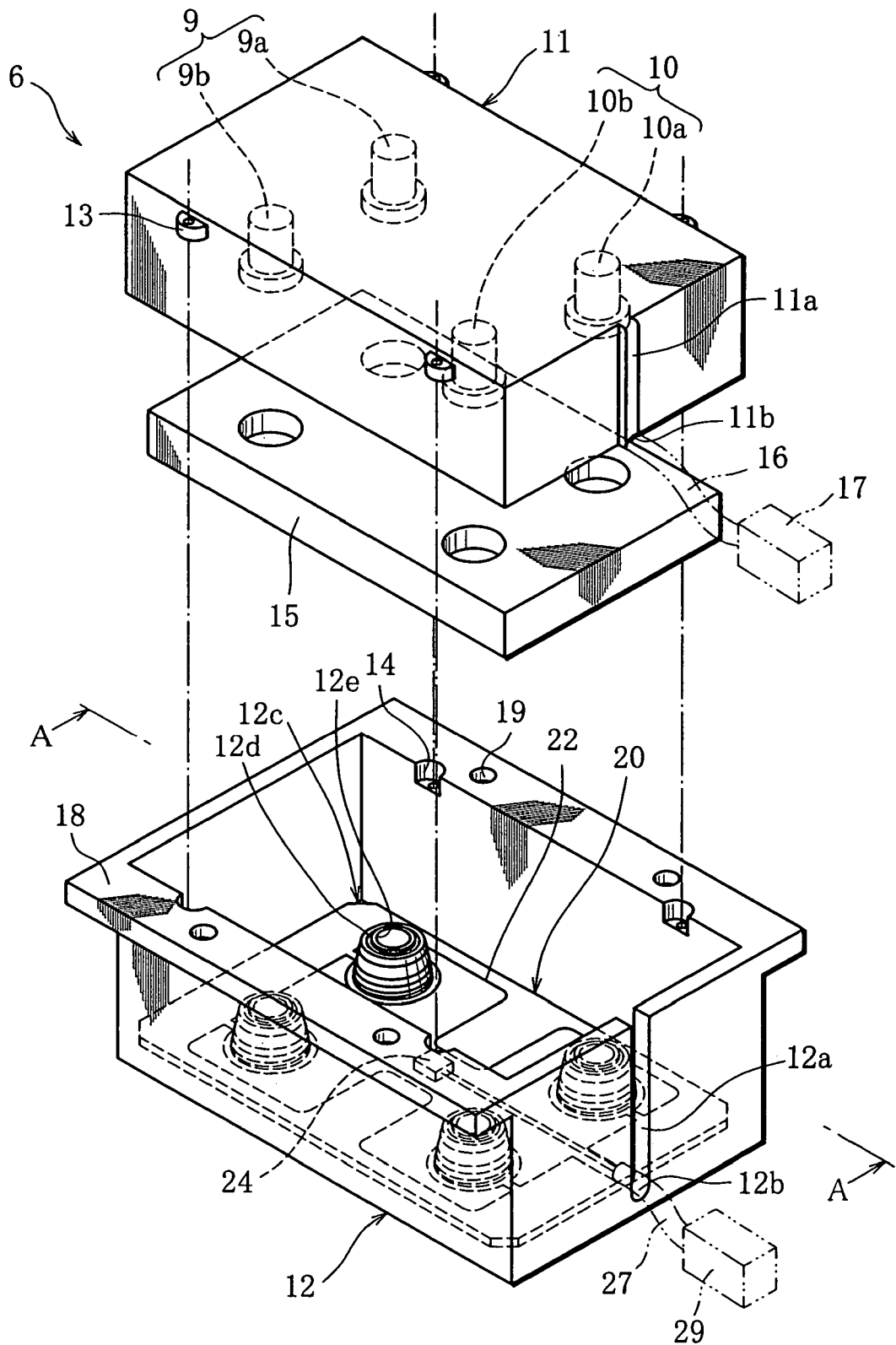
FIG. 3 is a diagram showing the structure of an ultrasonic sensor unit according to a first embodiment of the invention.

FIG. 3 is a diagram showing the structure of an ultrasonic sensor unit 6 according to a first embodiment of the invention. Based on FIG. 3, the ultrasonic sensor unit according to the first embodiment of the invention will be described below. As shown in FIG. 3, the ultrasonic sensor unit 6 according to the invention comprises, as main components, a case 11 of a C-like cross-section having a protrusion 11a on its outside, and a case 12 of an approximately C-like cross-section having a cut 12a in which the protrusion 11a of the case 11 is fitted. Specifically, in the ultrasonic sensor unit 6, the cases 11 and 12 have openings facing each other, and the case 11 is fitted in the case 12. By screwing screw-fitting parts 13 of the case 11 to screw-receiving parts 14 of the case 12, a box-like case as a housing of the ultrasonic sensor unit 6 is formed.

Two ultrasonic sensors 9 and 10 are arranged inside the case 11. A cover 15 made of a flexible material having openings corresponding to the sending surfaces and receiving surfaces of the ultrasonic sensors 9 and 10 is arranged to the sending/receiving surface side (the case 12 side) of the ultrasonic sensors 9 and 10 to form a sensor main body. The bottom of the cut 12b in the case 12 is formed as a curved part 12b, and that part of the protrusion 11a of the case 11 which faces the curved part 12b is formed as a curved part 11b. A harness 16 consisting of leads for the ultrasonic sensors 9 and 10 is drawn out of the cases 11 and 12 through a space defined by the curved parts 11b and 12b and connected to the ECU 7 by means of a connector 17.

In the ultrasonic sensor unit 6, in order that the ultrasonic sensors 9 and 10 can detect the road surface, the sending surfaces and receiving surfaces of the ultrasonic sensors 9 and 10 need to be exposed to the road surface. Hence, the bottom 12c of the case 12 has openings in the positions corresponding to the sending surfaces and receiving surfaces of the ultrasonic sensors 9 and 10.

Here, the structure and operation of the ultrasonic sensors 9 and 10 will be described briefly. The two ultrasonic sensors 9 and 10 comprise sending elements 9a and 10a, which performs as a signal sending part, and receiving elements 9b and 10b, which performs as a signal receiving part. In order that the two ultrasonic sensors 9 and 10 can send and receive ultrasonic wave signals along the vehicle width, the sending elements 9a and 10a are arranged on one side (right side, for example) of the vehicle width, along the longitudinal direction of the vehicle, while the receiving elements 9b and 10b are arranged on the other side (left side, for example) of the vehicle width, along the longitudinal direction of the vehicle. In other words, the directions in which the two ultrasonic sensors 9 and 10 send and receive ultrasonic wave signals are approximately parallel to each other and approximately perpendicular to the longitudinal direction of the vehicle. Thus, the ultrasonic sensor unit 6 can determine the inclination of the vehicle relative to the road surface R on the basis of a difference between the time of reception of an ultrasonic wave signal by the ultrasonic sensor 9 and the time of reception of an ultrasonic wave signal by the ultrasonic sensor 10.

Specifically, the receiving elements 9b and 10b receive ultrasonic wave signals sent out from the sending elements 9a and 10a and reflected by the road surface R, respectively. If the front part of the vehicle is inclined relative to the road surface R, the heights at which the ultrasonic sensors 9 and 10 detect the signals are different. Hence, the length of the path of the ultrasonic wave signal sent from the sending element 9a and received by the receiving element 9b and the length of the path of the ultrasonic wave signal sent from the sending element 10a and received by the receiving element 10b are different, which causes a difference between the time of reception of the ultrasonic wave signal by the receiving element 9a and that by the receiving element 10a. On the basis of this reception time difference, the ECU 7 determines the inclination of the vehicle relative to the road surface R.

Specifically, corresponding to the sending elements 9a and 10a and the receiving elements 9b and 10b, a plurality of horns 12d (four horns in this example) are formed at the bottom 12c of the case 12 to protrude to the inside of the case 12. In other words, the horns 12 are formed as if parts of the case 12 have sunk from the outside to the inside of the case 12. Each horn 12d has a tapered trumpet-like shape having a diameter gradually increased toward the outside of the case 12, and has a hole 12e at its top located inside the case 12. In other words, the holes 12e are located deep inside the case 12. Through these holes 12e, the sending surfaces of the sending elements 9a and 10a and the receiving surfaces of the receiving elements 9b and 10b are exposed to the road surface.

By means of the horns 12d, the directions in which the ultrasonic wave signals are sent from the sending elements 9a and 10a are limited to desired ranges, and the ultrasonic wave signals reflected are collected well. This helps the receiving elements 9b and 10b receive the ultrasonic wave signals assuredly. Further, since the holes 12e are located deep inside the case 12, foreign substances, water and the like are well prevented from entering the case 12 through the holes 12e.

Figure 4:
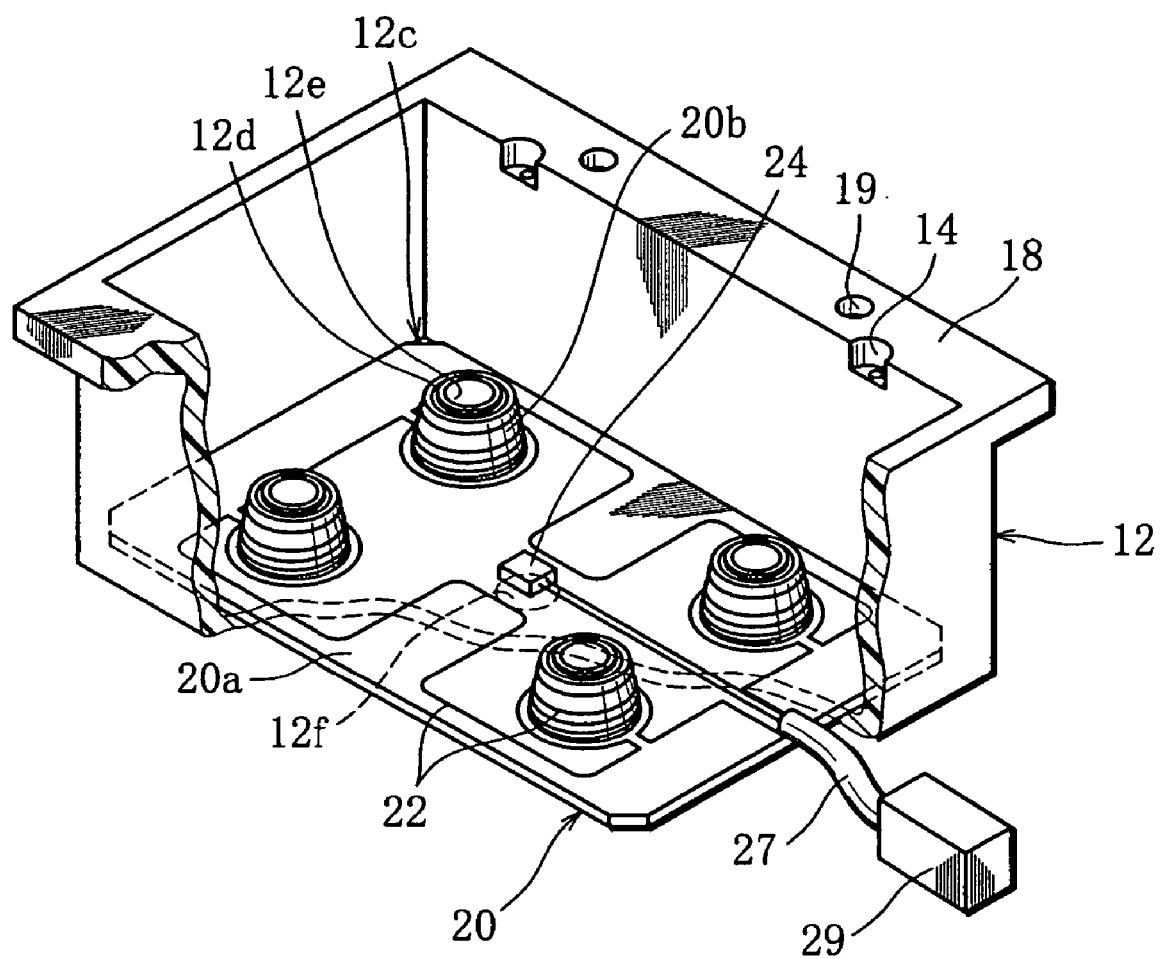
FIG. 4 is a diagram showing a bottom of a case of the ultrasonic sensor unit, in detail.
Figure 5:
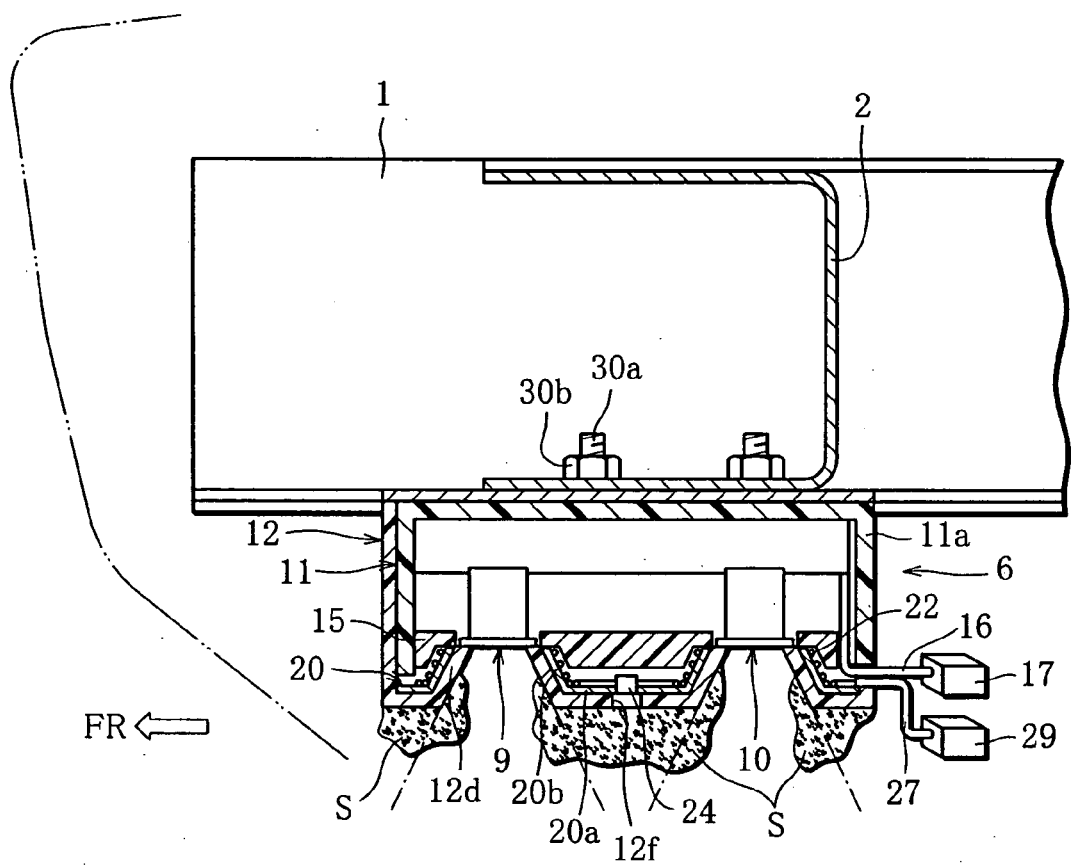
FIG. 5 is a cross-sectional view of the ultrasonic sensor unit along line A—A indicated in FIG. 3.

FIG. 4 shows the bottom 12c of the case 12 in detail. As shown in FIG. 4, a heater sheet (sheet component) 20 is arranged on the bottom 12c to cover the bottom 12c and surround each of the horns 12d. Specifically, the heater sheet 20 comprises a planer part 20a for covering the bottom 12c and horn parts 20b for surrounding the individual horns 12d, and all these parts are formed integrally. The heater sheet 20 is made from, for example a thin aluminum plate having high thermal conductivity. Specifically, the heater sheet 20 is formed by forming the horn parts 20b according to the shape of the horn 12d, for example by drawing. More specifically, as shown in FIG. 5 which is a cross-sectional view of the ultrasonic sensor unit 6 along line A—A indicated in FIG. 3, the heater sheet 20 is so formed that a slight space is provided between the horn parts 20b and their corresponding horns 12d. The slight space is omitted from being shown in FIG. 5.

In the bottom 12c of the case 12, a hole 12f is bored approximately in its center. Corresponding to this hole 12f, a temperature sensor 24 for detecting ambient temperature around the ultrasonic sensor unit 6 (the temperature of outside air and the case 12) is fitted to the heater sheet 20. The temperature sensor 24 is fitted, for example in the manner that it extends through the heater sheet 20. For the temperature sensor 24, for example a thermistor is used because of its high temperature detection performance, although the temperature sensor 24 is not limited to the thermistor.

On the heater sheet 20, a hot-wire heater 22 is laid to heat the bottom 12c and the horns 12d. In other words, the temperature sensor 24 and the hot-wire heater 22 unite with the heater sheet 20. This increases the ease of fitting the temperature sensor 24 and the hot-wire heater 22 to the case 12. Further, the heater sheet 20 can be easily attached to and detached from the case. Hence, when the temperature sensor 24 and the hot-wire heater 22 unite with the heater sheet 20, the temperature sensor 24 and the hot-wire heater 22 can be easily replaced, for example when they are out of order.

Although the hot-wire heater 22 is used in the discussed example, another heating means can be used in place of the hot-wire heater 22. However, when the hot-wire heater 22 is used, the heater sheet can be formed thin with a sufficient heating performance. In the discussed example, the hot-wire heater 22 is, for example stuck to the surface of the heater sheet 20. Alternatively, the hot-wire heater 22 may be buried in the heater sheet 20.

As shown in FIG. 4, the hot-wire heater 22 is laid to wind around each of the horn parts 20b and run on the planer part 20a. It is to be noted that the hot-wire heater 22 is wound around each of the horn parts 20b a plurality of times. More specifically, the number of turns of the hot-wire heater 22 is larger and the pitch between the turns is smaller on a part of each horn 12d located near the boundary between each horn 12d and the bottom 12c, or in other words, on a part near the open end of each horn 12d. The pitch between the turns becomes larger toward the hole 12e.

The hot-wire heater 22 is laid on the planer part 20a to run near the temperature sensor 24. Hence, even when snow and water drops splashed by the vehicle running, for example on a road with fallen snow adhere to the inside or periphery of each horn 12d and the inside or periphery of the hole 12f as frozen snow, heat generated by the hot-wire heater 22 is transferred through the heater sheet 20 to the case 12, so that the frozen snow that is attached or going to adhere to the inside or periphery of each horn 12d and the inside or periphery of the hole 12f is melted well and removed. Thus, the operation of the ultrasonic sensors 9 and 10 and of the temperature sensor 24 is ensured.

In particular, when water drops run down the wall of each horn 12d, frozen water, namely ice S easily adheres to a part of each horn 12d located near the boundary between each horn 12d and the bottom 12c, like icicles, as shown in FIG. 5. The ice S can interfere with ultrasonic wave signals (whose ranges are indicated by chain lines) and prevent the ultrasonic wave sensors 9 and 10 from operating normally. However, as stated above, the number of turns of the hot-wire heater 22 is made larger and the pitch between the turns is made smaller on these parts to ensure a sufficient heating value. Thus, the ice S that is attached like icicles or going to adhere is melted and removed assuredly, and the reliability of the ultrasonic sensors 9 and 10 improves.

Figure 6:
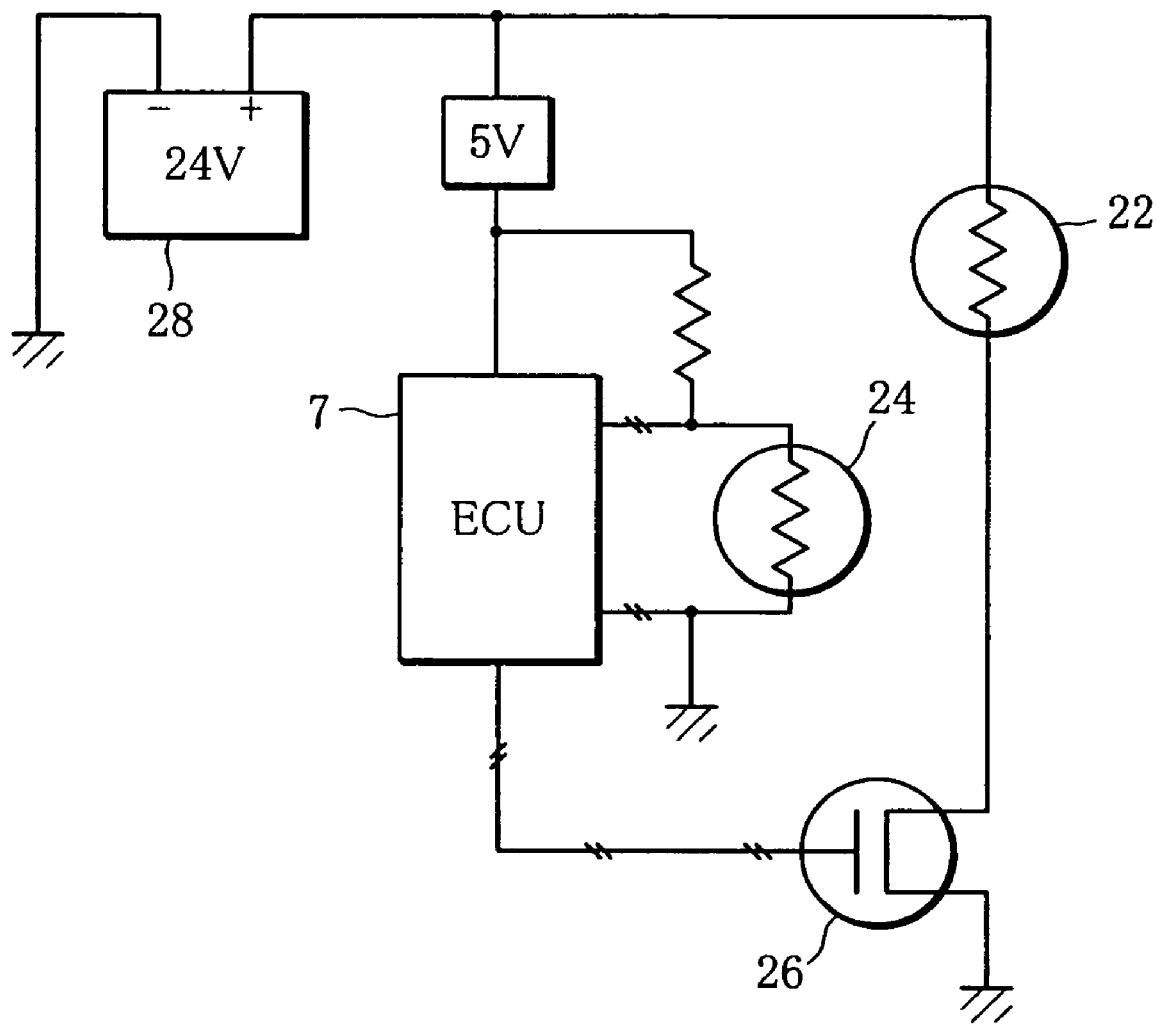
FIG. 6 is a diagram showing a circuit including a temperature sensor and a hot-wire heater.

FIG. 6 is a diagram showing a circuit including the temperature sensor 24 and the hot-wire heater 22. As shown in FIG. 6, the temperature sensor 24 is connected to the ECU 7. The hot-wire heater 22 is connected to a main battery 28 via a relay 26 whose magnetizing side is connected to the ECU 7. Specifically, as shown in FIGS. 3 to 5, like the above-mentioned harness 16, a harness 27 consisting of leads for the temperature sensor 24 and leads for the hot-wire heater 22 is drawn out of the case 12 through the space defined by the curved parts 11b and 12b and connected to the ECU 7 or the main battery 28 by means of a connector 29.

Figure 7:
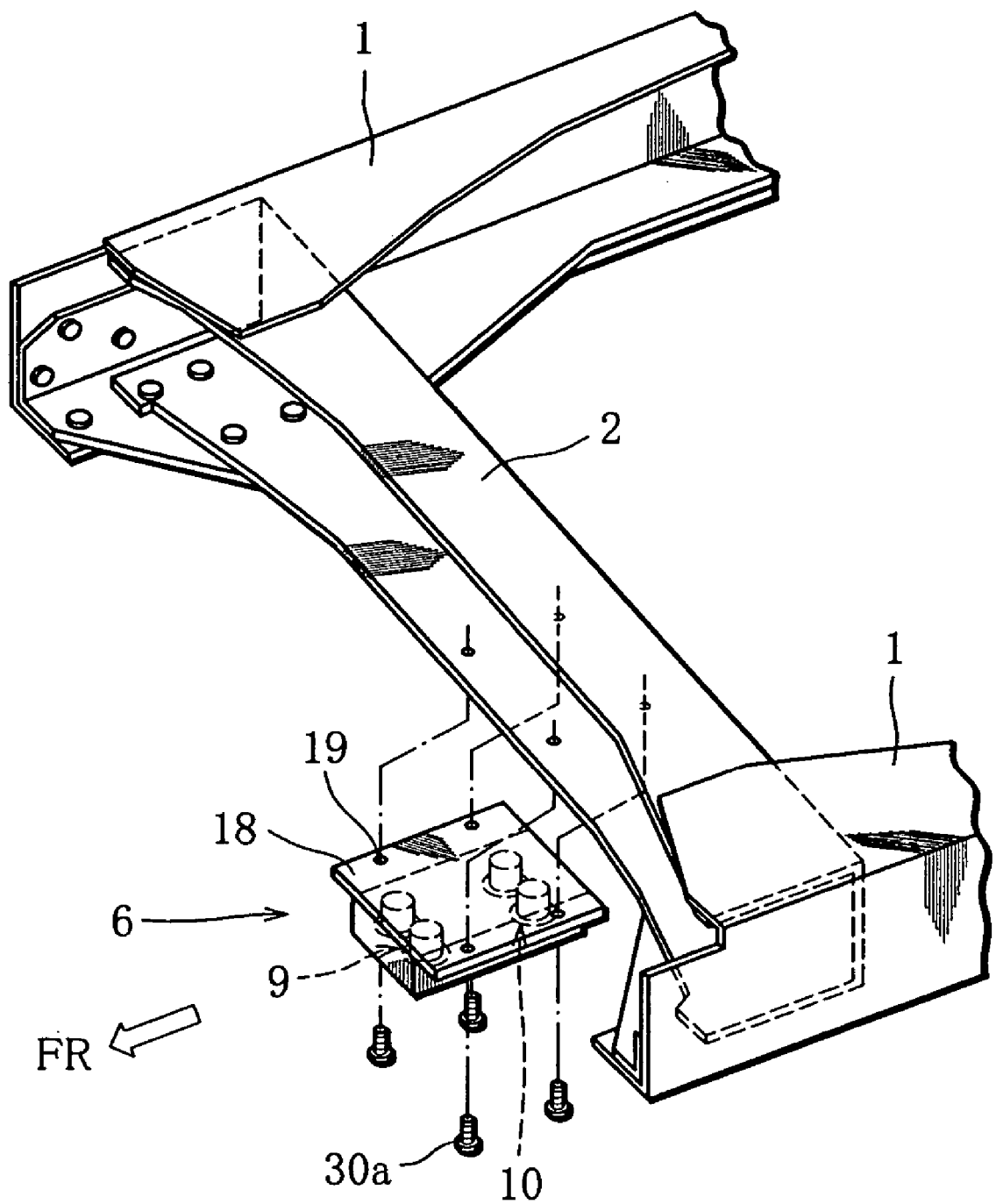
FIG. 7 is a diagram showing how the ultrasonic sensor unit is fitted to a cross member.

As shown in FIGS. 5 and 7, the ultrasonic sensor unit 6 is fitted to an intermediate part of a cross member 2 by means of bolts 30a and nuts 30b, for which bolt holes 19 are formed in a peripheral part 18 of the case 12. The ultrasonic sensor unit 6 thus fitted faces the road surface R, at the front part of the vehicle. Since the ultrasonic sensors 9 and 10 are contained in the cases 11 and 12, the ultrasonic sensor unit 6 itself is compact and easy to fit to the cross member 2.

Next, how the ultrasonic sensor unit 6 arranged as described above is controlled by the ECU 7 will be described.

Figure 8:
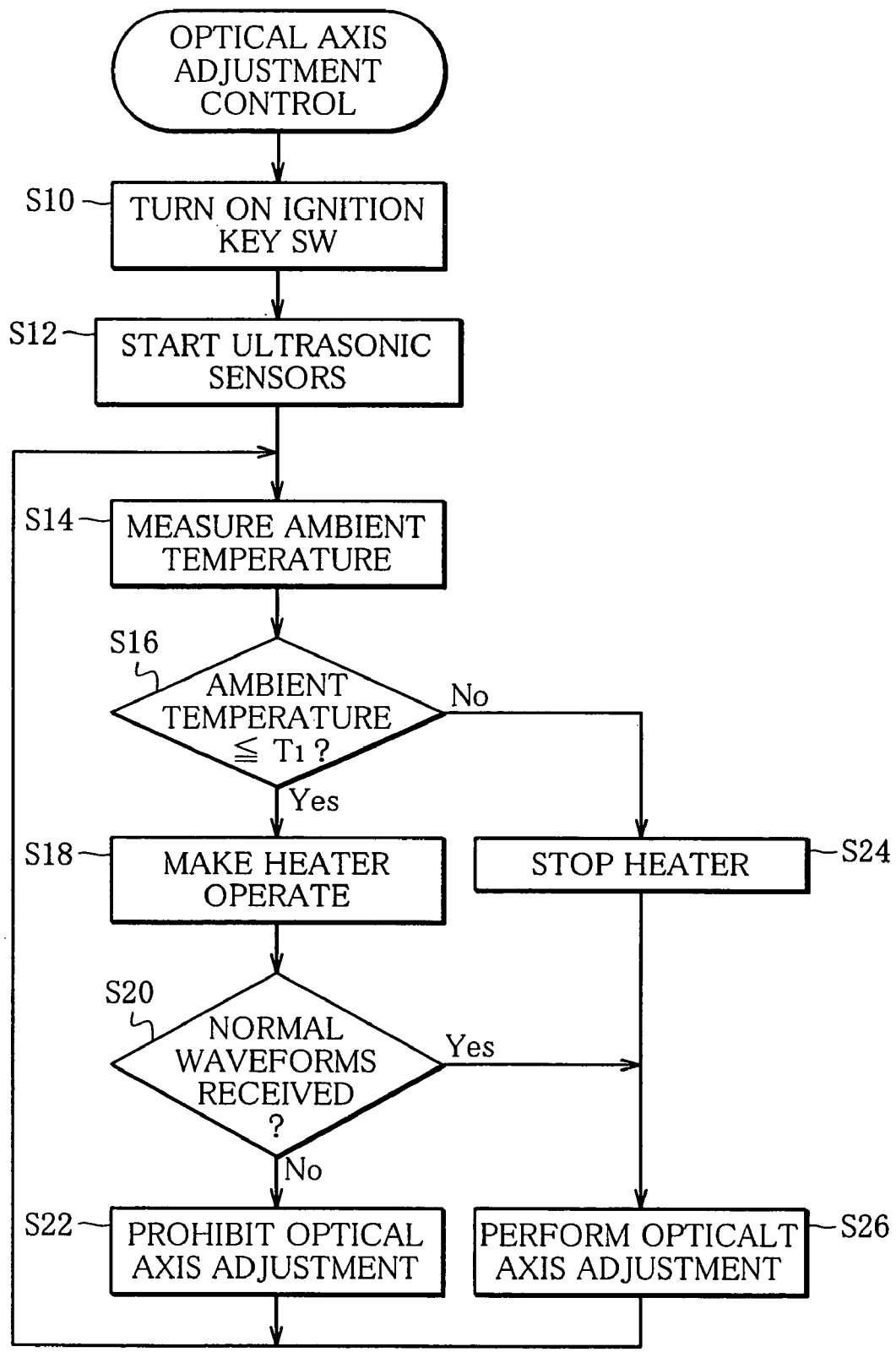
FIG. 8 is a flow chart showing an optical axis adjustment control routine for a vehicle headlamp optical axis adjustment apparatus including an ultrasonic sensor unit according to the invention.

FIG. 8 is a flow chart showing an optical axis adjustment control routine for a vehicle headlamp optical axis adjustment apparatus using the ultrasonic sensor unit 6 according to the invention.

When an ignition key SW is turned on in step S10, the ultrasonic sensors 9 and 10 of the ultrasonic sensor unit 6 start operating in step S12. At this time, the ambient temperature around the ultrasonic sensor unit 6 is measured on the basis of information from the temperature sensor 24 in step S14. In step S16, whether the ambient temperature measured is equal to or lower than a predetermined temperature T1 (4° C., for example) or not is determined. When the result of the determination is No, namely, it is determined that the ambient temperature is higher than the predetermined temperature T1, the situation is considered to be such that frozen snow will not adhere, or will melt well even if it adheres to the bottom 12c of the case 12 and/or the horns 12d. In this case, the hot-wire heater 22 is stopped in step S24 and optical axis adjustment is performed in step S26.

If the result of the determination in step S16 is Yes, namely, it is determined that the ambient temperature is equal to or lower than the predetermined temperature T1, the relay 26 is turned on in step S18 to pass a current to the hot-wire heater 22 to make the hot-wire heater 22 operate.

In other words, when frozen snow adheres to the bottom 12c of the case 12 and/or the horns 12d and hence the temperature of the bottom 12c and horns 12d or the ambient temperature near the bottom 12c falls to the predetermined temperature T1 or lower, heat generated by the hot-wire heater 22 is transferred to the bottom 12c and the horns 12d through the heater sheet 20, so that the bottom 12c and the horns 12d are heated with good responsiveness. As a result, frozen snow attached to the bottom 12c and/or the horns 12d is melted well and quickly, and the operation of the ultrasonic sensors 9 and 10 is ensured as mentioned above. The hot-wire heater 22 heats an area around the temperature sensor 24, or in other words, an area around the hole 12f at the same time. Hence, even if frozen snow adheres to the inside or periphery of the hole 12f, the frozen snow is melted well and the operation of the temperature sensor 24 is ensured.

Here, since the heater sheet 20 is made from a thin aluminum plate having high thermal conductivity, the heater sheet 20 can transfer the heat generated by the hot-wire heater 22 to the base 12c and the horns 12d well. Further, since the heater sheet 20 is so formed that a slight space is provided between the horn parts 20b and the horns 12d, a layer of air is formed between the horn parts 20b and the horns 12d. With the help of this layer of air, the heat generated by the hot-wire heater 22 can be transferred to the overall horns 12d uniformly and efficiently.

Even if frozen snow is not attached to the bottom 12c of the case 12 or the horns 12d, the hot-wire heater 22 starts operating when the ambient temperature falls to the predetermined temperature T1 or lower. Hence, in the situation such that the atmospheric temperature is low and frozen snow easily adheres to the bottom 12c of the case 12 and the horns 12d, adhesion of frozen snow is prevented and the operation of the ultrasonic sensors 9 and 10 are maintained well.

In step S20, whether the waveforms received by the receiving elements 9b and 10b of the ultrasonic sensors 9 and 10 are normal or not is determined. Specifically, the ECU 7 detects the size of a difference between the time of reception of an ultrasonic wave signal by the ultrasonic sensor 9 and the time of reception of an ultrasonic wave signal by the ultrasonic sensor 10, and determines whether the size of this reception time difference is normal or not. If frozen snow adheres to the bottom 12c of the case 12 or the horns 12d, the frozen snow attached interferes with ultrasonic wave signals, so that the size of the reception time difference changes to a great degree. The ECU determines whether such abnormal phenomenon is found or not.

If the result of the determination in step S20 is No, (namely, if it is determined that the waveforms received are abnormal), it suggests that frozen snow is not melted and attached to the bottom 12c of the case 12 and/or the horns 12d and hinders the operation of the ultrasonic sensors 9 and 10. In this case, the optical axis adjustment is prohibited in step S22. In this case, the optical axes are kept as they are, for example. It is to be noted that also when mud or the like adheres to the bottom 12c of the case 12 and/or the horns, the result of the determination in step S20 is No and hence the optical axis adjustment is prohibited.

If the result of the determination in step S20 is Yes, namely, it is determined that the waveforms received are normal, the optical axis adjustment is performed in step S26. After that, the process from step S14 to step S26 is repeated to perform the optical axis adjustment properly.

As stated above, in the ultrasonic sensor unit according to the invention, the use of the heater sheet 20 that can be easily attached and detached improves the ease of fitting the temperature sensor 24 and the hot-wire heater 22 to the case, and by means of these temperature sensor 24 and hot-wire heater 22, frozen snow attached to the case 12 can be melted assuredly to ensure the operation of the ultrasonic sensors 9 and 10 well. By applying this ultrasonic sensor unit 6 to the optical axis adjustment apparatus, the optical axis adjustment can be performed properly.

Next, an ultrasonic sensor unit according to a second embodiment of the invention will be described.

Figure 9:
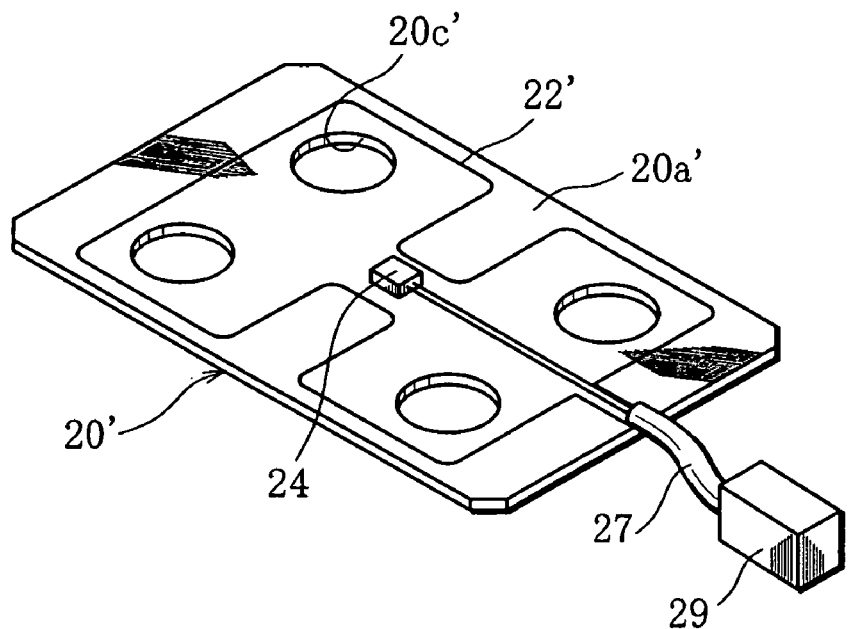
FIG. 9 is a diagram showing a heater sheet according to a second embodiment of the invention.

FIG. 9 shows the structure of a heater sheet 20' according to the second embodiment. Since the parts other than the heater sheet 20' are the same as those in the first embodiment, the description thereof will be omitted. As shown in FIG. 9, the heater sheet 20' does not have horn parts corresponding to the horns 12d of the case 12. Instead, through-holes 20c' through which the horns 12d are passed are formed. On the planer part 20a' of the heater sheet 20' which corresponds to the bottom 12c of the case 12, a hot-wire heater 22' is laid.

Also by this type of heater sheet 20' which does not have horn parts corresponding to the horns 12d and hence does not heat the horns 12d directly, heat generated by the hot-wire heater 22' is transferred to the case 12. Hence, also in this case, not only frozen snow attached to the base 12c but also frozen snow attached to the horns 12d is melted relatively well. By use of the heater sheet 20' that can be attached and detached easily, the ease of fitting the temperature sensor 24 and the hot-wire heater 22' to the case 12 can be improved, and the operation of the ultrasonic sensors 9 and 10 can be ensured well although not so well as in the first embodiment.

Here, it is desirable to lay the hot-wire heater 22' to run near the temperature sensor 24, as in the first embodiment. By this, not only the operation of the ultrasonic sensors 9 and 10 but also the operation of the temperature sensor 24 can be ensured.

Next, an ultrasonic sensor unit according to a third embodiment of the invention will be described.

Figure 10:
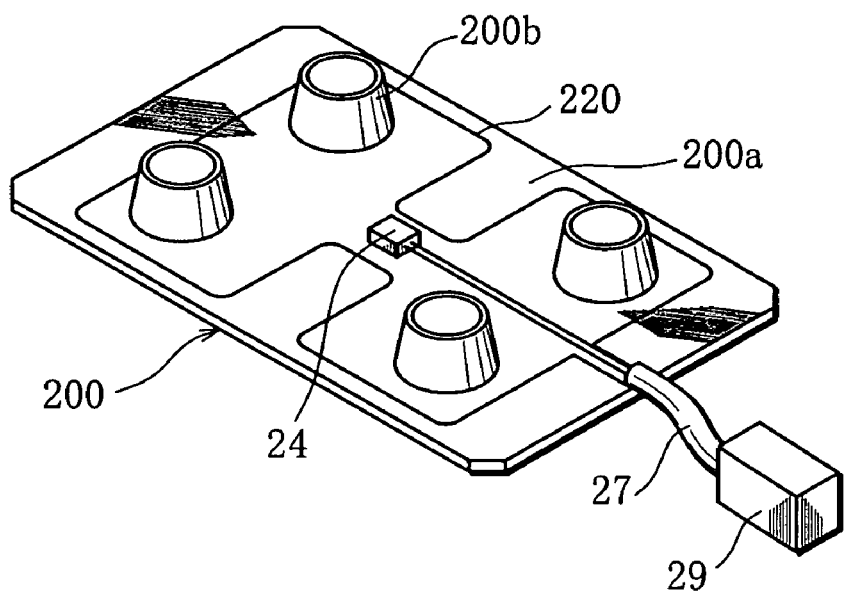
FIG. 10 is a diagram showing a heater sheet according to a third embodiment of the invention.

FIG. 10 shows the structure of a heater sheet 200 according to the third embodiment. Since the parts other than the heater sheet 200 are the same as those in the first embodiment, the description thereof will be omitted.

As shown in FIG. 10, while the heater sheet 200 has horn parts 200b corresponding to the horns 12d as in the first embodiment, a hot-wire heater 220 is laid only on the planer part 200a of the heater sheet 200 which corresponds to the bottom 12c. Also in the case in which the hot-wire heater 220 is not laid on the horn parts 200b although the heater sheet 200 has the horn parts 200b corresponding to the horns 12b like this, heat generated by the hot-wire heater 220 is transferred through the heater sheet 200 to the horn parts 200b and to the horns 12d. Hence, also in this case, not only frozen snow attached to the base 12c but also frozen snow attached to the horns 12d is melted relatively well. By use of the heater sheet 200 that can be attached and detached easily, the ease of fitting the temperature sensor 24 and the hot-wire heater 220 to the case 12 can be improved, and the operation of the ultrasonic sensors 9 and 10 can be ensured well although not so well as in the first embodiment.

Here, it is desirable to make a slight space between the horn parts 200b and the horns 12d, as in the first embodiment. In that case, with the help of a layer of air, heat generated by the hot-wire heater 220 can be transferred to the overall horns 12d uniformly and efficiently.

Further, it is desirable to lay the hot-wire heater 220 to run near the temperature sensor 24, as in the first and second embodiments. By this, not only the operation of the ultrasonic sensors 9 and 10 but also the operation of the temperature sensor 24 can be ensured.

Next, an ultrasonic sensor unit according to a fourth embodiment of the invention will be described.

Figure 11:
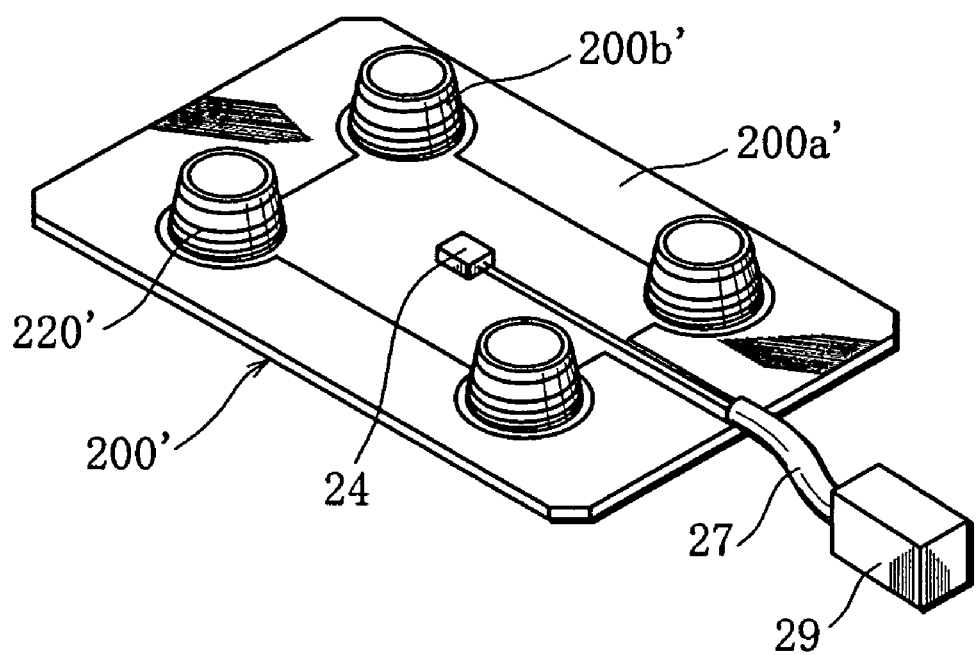
FIG. 11 is a diagram showing a heater sheet according to a fourth embodiment.

FIG. 11 shows the structure of a heater sheet 200' according to the fourth embodiment. Since the parts other than the heater sheet 200' are the same as those in the first embodiment, the description thereof will be omitted.

As shown in FIG. 11, the heater sheet 200' has horn parts 200b' corresponding to the horns 12d as in the first embodiment, and a hot-wire heater 220' is mainly laid only on the horn parts 200b'.

Also in the case of this heater sheet 200' with the hot-wire heater 220' mainly laid only on the horn parts 200b', heat generated by the hot-wire heater 220' is transferred through the heater sheet 200' to the planer part 200a' and to the base 12c. Hence, also in this case, not only frozen snow attached to the horns 12d but also frozen snow attached to the base 12c is melted relatively well. By use of the heater sheet 200' that can be attached and detached easily, the ease of fitting the temperature sensor 24 and the hot-wire heater 220' to the case 12 can be improved, and the operation of the ultrasonic sensors 9 and 10 can be ensured well although not so well as in the first embodiment.

Here, it is desirable to make a slight space between the horn parts 200b' and the horns 12d, as in the first and third embodiments. In that case, with the help of a layer of air, heat generated by the hot-wire heater 220' can be transferred to the overall horns 12d uniformly and efficiently.

Further, it is desirable to lay the hot-wire heater 220' in the manner that the number of turns of the hot-wire heater 220' is larger and the pitch between the turns is smaller on a part near the open end of each horn 12d, and that the pitch between the turns becomes larger toward the hole 12e, as in the first embodiment. By this, ice that is attached to the above-mentioned part like icicles or going to adhere can be melted and removed assuredly, and the reliability of the ultrasonic sensors 9 and 10 can be improved.

Although the ultrasonic sensor units according to some embodiments of the present invention have been described above, the invention is not limited to these embodiments.

For example, although the heater sheets 20, 20', 200, 200' in the described embodiments are made from a thin aluminum plate having high thermal conductivity, the heater sheets 20, 20', 200, 200' may be made from another metallic material or any other material having good thermal conductivity.

Further, although the described embodiments have a temperature sensor 24, the temperature sensor 24 can be omitted.

Further, although the hot-wire heaters 22, 22', 220 are laid on the planer parts 20a, 20a' 200 to mainly describe straight lines, the hot-wire heater may describe curves on the planer part.

The invention being thus described, it will be obvious that the same may be varied in many ways. Such variations are not to be regarded as a departure from the spirit and scope of the invention, and all such modifications as would be obvious to one skilled in the art are intended to be included within the cope of the following claims.

What is claimed is:

1. An ultrasonic sensor unit, comprising:
an ultrasonic sensor,
a case for containing the ultrasonic sensor, the case having a horn protruding from an inner side of a bottom of the case and having a tapered opening having a diameter gradually increased toward the outside of the case, to expose an a sending element and a receiving element of the ultrasonic sensor to an outside of the case, and
a sheet component arranged on the inner side of the bottom of the case to cover the bottom and surround the horn, and having a hot-wire heater buried in or mounted on its part covering the bottom and its part surrounding the horn, wherein
said hot-wire heater surrounding the horn is wound around the horn a plurality of times so that the pitch between the turns of the hot-wire heater is smaller on a part near the open end of the horn and/or a hot wire of said hot-wire heater surrounding the horn is formed thicker or wider on the part near the open end of the horn.

2. The ultrasonic sensor unit according to claim 1, wherein
a temperature sensor for detecting the temperature of the bottom of the case or ambient temperature near the bottom is buried in or mounted on the sheet component.

3. The ultrasonic sensor unit according to claim 1, wherein:
the sheet component is designed to be easily attached to and detached from the case.

4. The ultrasonic sensor unit according to claim 1, wherein:
the sheet component is a metallic component.

5. The ultrasonic sensor unit according to claim 1, wherein
a space is provided between the sheet component and the horn.

6. The ultrasonic sensor unit according to claim 4, wherein
A temperature sensor for detecting the temperature of the bottom of the case or ambient temperature near me bottom is buried in or mounted on the sheet component, and
Said hat-wire heater is energized when the ambient temperature is determined to be equal or lower than a predetermined temperature based on information from said temperature sensor and said hot-wire heater buried in or mounted on the part of the sheet component covering the bottom is arranged to run near the temperature sensor.

* * * * *